United States Patent [19]
Ohtake

[11] Patent Number: 5,243,468
[45] Date of Patent: Sep. 7, 1993

[54] WIDE ANGLE OBJECTIVE LENS

[75] Inventor: Motoyuki Ohtake, Ohmiya, Japan
[73] Assignee: Nikon Corporation, Tokyo, Japan
[21] Appl. No.: 983,735
[22] Filed: Dec. 1, 1992
[30] Foreign Application Priority Data
Dec. 6, 1991 [JP] Japan .................. 3-322186
[51] Int. Cl.$^5$ ............... G02B 9/34; G02B 9/62
[52] U.S. Cl. .................. 359/740; 359/747; 359/757; 359/772
[58] Field of Search ............ 359/740, 757–758, 359/764, 772, 747

[56] References Cited
U.S. PATENT DOCUMENTS 4,235,521 11/1980 Imai .................. 359/766
4,394,073 7/1983 Wakamiya ............. 359/764

FOREIGN PATENT DOCUMENTS
43-30782 12/1943 Japan .
44-10831 5/1969 Japan .
1-209413 8/1989 Japan .

Primary Examiner—Bruce Y. Arnold
Assistant Examiner—James Phan
Attorney, Agent, or Firm—Shapiro and Shapiro

[57] ABSTRACT

A wide angle objective lens has, in succession from the object side, a first lens component which is a positive meniscus lens having its convex surface facing the object side, a second lens component which is a cemented meniscus lens comprising a negative lens and a positive lens cemented together and having its concave surface facing the object side and having positive refractive power, a third lens component which is a cemented meniscus lens comprising a negative lens and a positive lens cemented together and having its concave surface facing the object side and having positive refractive power, and a fourth lens component which is a negative meniscus lens having its concave surface facing the object side, and has a stop between the second lens component and the third lens component, and satisfies various predetermined conditions.

15 Claims, 1 Drawing Sheet

WIDE ANGLE OBJECTIVE LENS

BACKGROUND OF THE INVENTION

1. Field of the Invention

This invention relates to a wide angle objective lens, and particularly to a wide angle objective lens suitable for use with a 35 mm format lens shutter camera, a 35 mm format camera with a range finder or the like.

2. Related Background Art

An optical system of four-unit construction of the so-called telephoto type in which a posterior unit having negative refractive power is disposed rearwardly of an anterior unit of positive-negative-positive lens unit construction having positive refractive power to shorten the full length of a standard lens for a compact camera to the focal plane thereof is known as is disclosed, for example, in Japanese Patent Publication No. 44-10831.

As a wide angle objective lens of such telephoto type and having an angle of view wider than that of a standard lens, there are known an example in which as disclosed in U.S. Pat. No. 4,394,073, an anterior unit disposed forwardly of a negative posterior unit is made into a four-unit construction of positive-negative-positive-positive to thereby improve coma and the eclipse of the marginal light flux, an example in which as disclosed in U.S. Pat. No. 4,235,521, a negative posterior unit is comprised of two negative and positive meniscus lenses to thereby achieve an angle of view of 60° or greater and brightness of F-number 2.8, an example in which as disclosed in Japanese Laid-Open Patent Application No. 1-209413, a negative lens component in an anterior unit is a cemented lens comprising a negative biconcave lens and a positive meniscus lens, etc..

In these optical systems of the telephoto type, however, in order to achieve the compactness thereof, the refractive powers of the anterior unit having positive refractive power and the posterior unit having negative refractive power have been made great and moreover, the air gap between the anterior unit and the posterior unit has been made great. Therefore, the marginal light flux has been eclipsed, and this has led to the disadvantages that not only the quantity of marginal light becomes deficient, but also distortion shifts greatly to the positive and chromatic difference of magnification also is greatly fluctuated by the angle of view. Further, the refractive power of each lens component is great, and this has led to the disadvantage that curvature of image field increases.

Also, in the aforementioned U.S. Pat. No. 4,235,521, a positive lens is disposed most adjacent to the image side and this has led to the disadvantage that the effecitve diameter of this positive lens most adjacent to the image side becomes great and further, from the mutual ecccentricity or inclination or the like of the negative lens and the positive lens in the posterior unit, it has been difficult to provide a predetermined optical performance in manufacture. Also in the wide angle lens described in the aforementioned U.S. Pat. No. 4,394,073, from the mutual eccentricity or inclination or the like of a negative second lens component and a positive third lens component, it has been difficult to obtain a predetermined optical performance in manufacture.

Further, in the wide angle lens described in the aforementioned Japanese Laid-Open Patent Application No. 1-209413, the cemented surface in a negative second lens component has negative refractive power and therefore, positive spherical aberration of high order has occurred and the correction of spherical aberration could not be sufficiently accomplished.

SUMMARY OF THE INVENTION

Accordingly, it is an object of the present invention to solve the above-noted problems peculiar to the wide angle lenses according to the prior art and to provide a compact wide angle objective lens of high performance in which the fluctuation of aberrations when focusing is effected is suppressed and an improvement in the performance in a short distance in-focus state is achieved and also the deterioration of the performance by the eccentricity of each lens unit is little.

To achieve the above object, the wide angle objective lens according to the present invention includes, in succession from the object side, a positive first lens component comprising a positive meniscus lens having its convex surface facing the object side, a positive second lens component comprising a cemented meniscus lens comprising a negative lens and a positive lens cemented together and having its concave surface facing the object side, a positive third lens component comprising a cemented meniscus lens comprising a negative lens and a positive lens cemented together and having its concave surface facing the object side, and a negative fourth lens component comprising a negative meniscus lens having its concave surface facing the object side, and is constructed into a refractive power arrangement of the telephoto type as a whole. It also has a stop between the second lens component and the third lens component.

As described above, in the present invention, the three lens components in the anterior unit are comprised of only lens units having positive refractive power and therefore, if the combined refractive power of this anterior unit is the same, the refractive power of each lens component can be made smaller than in the prior-art wide angle lenses of positive-negative-positive lens unit construction and accordingly, it is possible to suppess the deterioration of the performance caused by the eccentricity of each lens component. Also, the refractive index of the positive lens in the second lens component is made higher than that of the negative lens in the same lens component to thereby suppress astigmatism and curvature of image field and further, the cemented surface thereof is endowed with positive refractive power to thereby correct spherical aberration better. Also, in order to well suppress negative astigmatism occurring when short distance focusing is effected, that surface of the second lens component which is most adjacent to the image side is designed to have its convex surface fact the image side.

Further, when the refractive index of the negative lens in the second lens component for d-line ($\lambda = 597.6$ nm) is $n_{21}$ and the refractive index of the positive lens in the same lens component for d-line ($\lambda = 597.6$ nm) is $n_{22}$ and the radius of curvature of that surface of the second lens component which is most adjacent to the image side is $r_{22}$ and the radius of curvature of the cemented surface in the second lens component is $r_{2M}$ and the focal length of the third lens component is $f_3$ and the radius of curvature of that surface of the third lens component which is most adjacent to the object side is $r_{31}$ and the mean value of the absolute values of the refractive powers of the first to fourth lens components is $\psi_{1-4}$ and the refractive power of the entire optical system is $\psi$ and the refractive power $\psi_{2M}$ of the cemented surface in the second lens component is expressed as $\psi_{2M}=(n_{22}-n_{21})/r_{2M}$, the first to fourth lens components may preferably be designed to satisfy the following conditions:

$$-0.9 \leq \psi_{2M} \cdot r_{22} \leq -0.1 : r_{22} < 0$$

$$-0.6 \leq r_{31}/f_3 \leq -0.1 : r_{31} < 0$$

$$\psi_{104}/\psi < 0.9$$

Other objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

Figure 1:
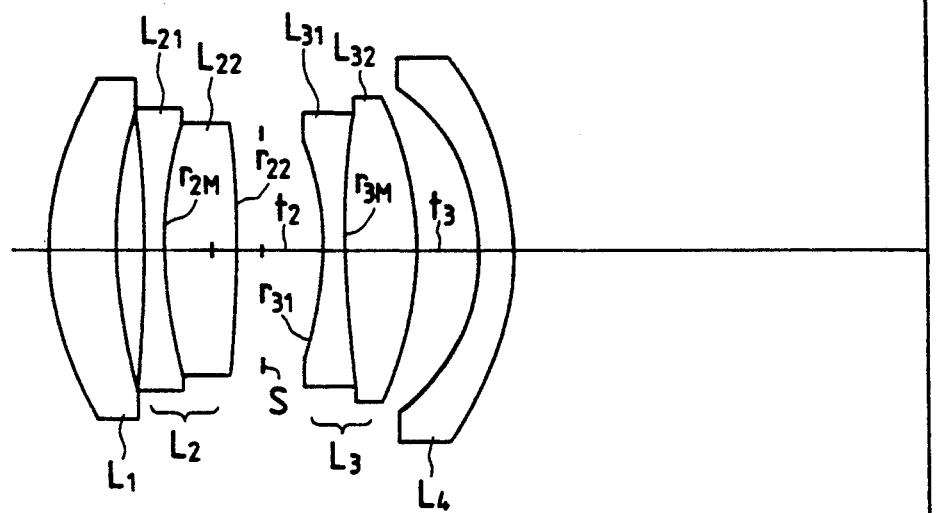
FIG. 1 shows the lens construction of first to fourth embodiments of the present invention.
Figure 2:
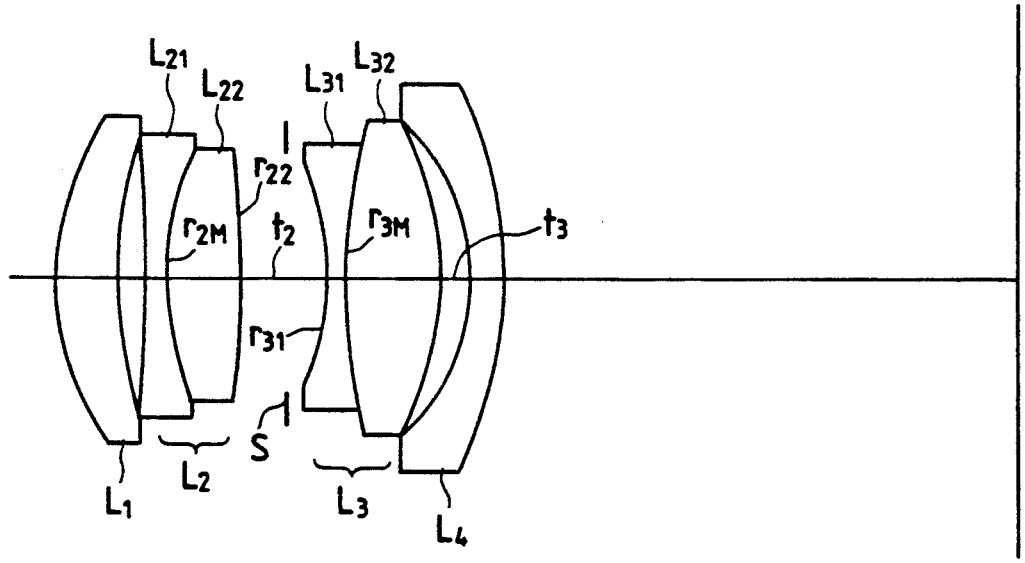
FIG. 2 shows the lens construction of a fifth embodiment of the present invention.

FIG. 1 shows the lens construction of first to fourth embodiments of the present invention, and FIG. 2 shows the lens construction of a fifth embodiment in which the spacing between a third lens component and a fourth lens component is very short.

Any of the wide angle lenses of the present invention, as shown in FIGS. 1 and 2, includes, in succession from the object side, a first lens component L1 which is a positive meniscus lens having its convex surface facing the object side, a second lens component L2 comprising a cemented meniscus lens comprising a negative lens L21 and a positive lens L22 cemented together and having its concave surface facing the object side, and having positive refractive power, a third lens component L3 comprising a cemented meniscus lens comprising a negative lens L31 and a positive lens L32 cemented together and having its concave surface facing the object side, and having positive refractive power, and a fourth lens component L4 which is a positive meniscus lens having its convex surface facing the object side, and further has a stop S between the second lens unit L2 and the third lens unit L3.

The wide angle lens of the present invention is of a construction of so-called telephoto type refractive power arrangement as a whole, from the fact that as described above, the first lens component L1, the second lens component L2 and the third lens component L3 each have positive refractive power and the fourth lens component L4 has negative refractive power.

The prior-art wide angle lens of the telephoto type has an anterior unit having positive refractive power and comprised of three positive, negative and positive lens components or four positive, negative, positive and positive lens components, and the refractive power of each lens component is very strong and therefore, due to the eccentricity, inclination or the like of the lenses, it has been difficult to provide a predetermined optical performance in manufacture. It has also suffered from the disadvantage that chromatic difference of magnification is greatly fluctuated by the angle of view.

So, according to the present invention, the anterior unit is comprised of only three lens components each having positive refractive power, and even if the combined refractive power of the anterior unit is the same as the combined refractive power of the anterior unit of the prior-art positive-negative-positive lens construction, the refractive power of each lens component can be made small and it is possible to suppress the deterioration of performance caused by the eccentricity of each unit.

Also, by the stop S being disposed between the positive second lens component L2 and the positive third lens component L3, it is made possible to increase the quantity of marginal light and make the refractive power distributions before and behind the stop substantially approximate to a symmetrical type, thereby correcting distortion better.

Also, that surface of the second lens component L2 which is most adjacent to the image side has its convex surface face the image side to well suppress negative astigmatism occurring when the short distance focusing by the totally axially moving system is effected.

In the lens system of the conventional telephoto type, the correction of spherical aberration has heretofore been effected chiefly by that surface of the negative second lens unit which is most adjacent to the object side, while in the present invention, the refractive index of the positive lens in the second lens component L2 is made higher than that of the negative lens in the same lens component to decrease Petzval sum and suppress astigmatism and curvature of image field and further, the cemented surface thereof is endowed with positive refractive power to thereby cause negative spherical aberration of high order to occur, and correct spherical aberration better.

Further, the third lens component L3 is designed such that the surface thereof which is most adjacent to the object side has its concave surface face the stop S, and this surface shares the correction of spherical aberration with the cemented surface in the second lens component L2. Also, since said surface which is most adjacent to the object side has its concave surface face the stop S, aberrations to off-axis rays are not liable to occur and it becomes possible to obtain a good image plane performance.

The fourth lens component L4 is a negative meniscus lens having its concave surface facing the stop S in order to correct curvature of image field and astigmatism sufficiently.

The wide angle lens of the present invention is constructed as described above, and it is desirable that the wide angle lens of the present invention be further designed to satisfy the following conditions:

$$-0.9 \leq \psi_{2M} \cdot r_{22} \leq -0.1 : r_{22} < 0 \quad (1)$$

$$-0.6 \leq r_{31}/f_3 \leq -0.1 : r_{31} < 0 \quad (2)$$

$$\psi_{104}/\psi < 0.9 \quad (3)$$

where $\psi_{2M}$: the refractive power of the cemented surface in the second lens component L2 expressed by the following equation:

$$\psi_{2M}=(n_{22}-n_{21})/r_{2M}$$

$r_{22}$: the radius of curvature of that surface of the second lens component L2 which is most adjacent to the image side;

$n_{21}$: the refractive index of the negative lens L21 in the second lens component L2 for d-line ($\lambda=587.6$ nm);

$n_{22}$: the refractive index of the positive lens L22 in the second lens component L2 for d-line ($\lambda=587.6$ nm);

$r_{2M}$: the radius of curvature of the cemented surface in the second lens component L2;

$r_{31}$: the radius of curvature of that surface of the third lens component L3 which is most adjacent to the object side;

$f_3$: the focal length of the third lens component L3;

$\psi_{1-4}$: the mean value of the absolute values of the refractive powers of the first to fourth lens components L1 to L4;

$\psi$: the refractive power of the entire optical system.

Further, with regard to the third lens component L3 and the fourth lens component L4, it is desirable that the wide angle lens of the present invention be designed to satisfy the following conditions:

$$0 < \psi_{3M}/\psi < 0.5; r_{3M} > 0 \quad (4)$$

$$0.2 \leq t_3/t_2 \leq 1.0, \quad (5)$$

where $\psi_{3M}$: the refractive power of the cemented surface in the third lens component L3 expressed by the following equation:

$$\psi_{3M} = (n_{32} - n_{31})/r_{3M}$$

$\psi$: the refractive power of the entire optical system;

$r_{3M}$: the radius of curvature of the cemented surface in the third lens component L3;

$n_{31}$: the refractive index of the negative lens L31 in the third lens component L3 for d-line ($\lambda=587.6$ nm);

$n_{32}$: the refractive index of the positive lens L32 in the third lens component L3 for d-line ($\lambda=587.6$ nm);

$t_2$: the air gap on the optical axis from that surface of the second lens component L2 which is most adjacent to the image side to that surface of the third lens component L3 which is most adjacent to the object side;

$t_3$: the air gap on the optical axis from that surface of the third lens component L3 which is most adjacent to the image side to that surface of the fourth lens component L4 which is most adjacent to the object side.

Furthermore, when the mean value of the refractive indices of the positive lenses L1, L22 and L32 in the entire optical system for d-line (587.6 nm) is Np and the mean value of the refractive indices of the negative lenses L21, L31 and L4 for d-line ($\lambda=587.6$ nm) is Nn, it is desirable that the wide angle lens of the present invention be designed to satisfy the following conditions:

$$Np > 1.70 \quad (6)$$

$$Nn > 1.70 \quad (7)$$

The above-mentioned conditional expressions in the present invention will hereinafter be described in detail.

Conditional expression (1) is a condition for contriving the balance with spherical aberration and curvature of image field and further, the amount of fluctuation of astigmatism during the short distance focusing by the totally axially moving system.

When the lower limit of conditional expression (1) is exceeded, the following cases ① and ② are conceivable:

① A case where the refractive power $\psi_{2M}$ of the cemented surface in the second lens component L2 is great; and ② A case where the radius of curvature $r_{22}$ of that surface of the second lens component L2 which is most adjacent to the image side is negative and great.

In case ①, curvature of image field decreases, but positive distortion increases and negative spherical aberration become uncorrectable. In case ②, astigmatic difference becomes small and spherical aberration can be corrected well, but curvature of image field increases. Also, during short distance focusing, negative astigmatism occurs greatly, and this is not preferable.

When the upper limit of conditional expression (1) is exceeded, the following cases ③ and ④ are conceivable:

③ A case where the refractive power $\psi_{2M}$ of the cemented surface in the second lens component L2 is small; and ④ A case where the radius of curvature $r_{22}$ of that surface of the second lens component L2 which is most adjacent to the image side is negative and small.

In case ③, spherical aberration can be corrected well, but curvatrue of image field increases, and this is not preferable. In case ④, curvatrue of image field decreases and negative astigmatism occurring during short distance focusing can be suppressed to a small level, but astigmatic difference becomes great and negative spherical aberration become uncorrectable.

Conditional expression (2) is a condition for contriving the balance between on-axis aberrations and off-axis aberrations.

When the lower limit of conditional expression (2) is exceeded, the following cases ⑤ and ⑥ are conceivable:

⑤ A case where the radius of curvature $r_{31}$ of that surface of the third lens component L3 which is most adjacent to the object side is negative and great; and ⑥ A case where the focal length $f_2$ of the second lens component L2 is small.

In case ⑤, curvature of image field decreases and astigmatic difference also becomes small, but positive distortion increases and spherical aberration becomes uncorrectable. In case ⑥, spherical aberration can be corrected well, but Petzval sum increases greatly to the positive and curvature of image field increases and thus, a good image plane performance becomes unobtainable.

When the upper limit of conditional expression (2) is exceeded, the following cases ⑦ and ⑧ are conceivable:

⑦ A case where the radius of curvature $r_{31}$ of that surface of the third lens component L3 which is most adjacent to the object side is small; and ⑧ A case where the focal length $f_2$ of the second lens component L2 is great.

In case ⑦, spherical aberration can be corrected well, but curvature of image field increases and astigmatic difference becomes great. In case ⑧, curvature of image field decreases and a good image plane performance is obtained, but spherical aberration becomes uncorrectable.

Conditional expression (3) is a condition for prescribing the deterioration of performance caused by the mutual eccentricity, inclination, etc. of the lens components.

If the upper limit of this conditional expression is exceeded, the refractive power of each lens component will become strong and therefore, the deterioration of performance by the mutual eccentricity of the lens components will become great, and this is not preferable. Also, curvature of image field will increase and the quantity of marginal light will be remarkably reduced, and this is not preferable.

Conditional expressions (4) and (5) will now be described in detail.

Conditional expression (4) is a condition for prescribing the refractive power of the cemented surface in the third lens component L3.

If the upper limit of conditional expression (4) is exceeded, negative spherical aberration of high order will occur and the correction of spherical aberration will become possible, but astigmatic difference will increase in a portion having a great angle of view and therefore, a good image plane performance will become unobtainable. If conversely, the lower limit of conditional expression (4) is exceeded, positive distortion will occur greatly and the correction of spherical aberration will be deficient.

Conditional expression (5) is a condition for contriving the balance between on-axis aberrations and off-axis aberrations.

When the lower limit of this conditional expression (5) is exceeded, the following cases ⑨ and ⑩ are conceivable:

⑨ A case where $t_3$ is small; and

⑩ A case where $t_2$ is great.

In case ⑨, the difference between the heights of the on-axis ray and the off-axis ray becomes small in the fourth lens component L4 and therefore, the degree of freedom of aberration correction is deficient and on-axis aberrations and off-axis aberrations cannot be corrected independently of each other. Also, to render the focal length of the optical system into a predetermined value, the refractive power of the fourth lens component L4 becomes great and therefore, curvature of image field increases, and this is not desirable. In case ⑩, on-axis aberrations and off-axis aberrations can be corrected independently of each other, but if an increase in the quantity of marginal light is contrived, the effective diameter of the lens will become large, and this is not preferable.

Also, when the upper limit of conditional expression (5) is exceeded, the following cases ⑪ and ⑫ are conceivable:

A case where $t_3$ is great; and

A case where $t_2$ is small.

In case ⑪, conversely to the aforedescribed case ⑨, on-axis aberrations and off-axis aberrations can be corrected independently of each other and a better image plane performance can be obtained. However, the effective diameter of the lens becomes large, and this is not preferable. In case ⑫, the difference between the heights of the on-axis ray and the off-axis ray becomes small in the lenses far from the stop S and therefore, the degree of freedom of aberration correction is deficient and on-axis aberrations and off-axis aberrations cannot be corrected independently of each other. It also becomes impossible to dispose the stop and a shutter mechanism, and this is not preferable.

Conditional expressions (6) and (7) are conditions regarding the distribution of the refractive index in the optical system.

If the lower limit of conditional expression (6) is exceeded or if the upper limit of conditional expression (7) is exceeded, Petzval sum will exhibit a great positive value and thus, curvature of image field and negative astigmatism will become uncorrectable, and this is not preferable.

The constructions of the embodiments of the present invention will now be described in greater detail.

In any of the first to fourth embodiments, as shown in FIG. 1, the first lens component L1 comprises a positive meniscus lens having its convex surface facing the object side, and the second lens component L2 is comprised of a positive cemented meniscus lens comprising a biconcave lens L21 and a biconvex lens L22 having a refractive index higher than that of the biconcave lens L21, the lenses L21 and L22 being cemented together, the positive cemented meniscus lens having its concave surface facing the object side. The third lens component L3, like the second lens component L2, comprises a positive cemented meniscus lens comprising a biconcave lens L31 and a bicovex lens L32 having a refractive index higher than that of the biconcave Lens L31, the lenses L31 and L32 being cemented together, the positive cemented meniscus lens having its concave surface facing the object side, and the fourth lens component L4 comprises a negative meniscus lens having its concave surface facing the object side, and the entire lens system is comprised of four units six lenses. The stop S is provided between the second lens component L2 and the third lens component L3.

The fifth embodiment assumes a construction substantially similar to the constructions of the first to fourth embodiments, with the exception that as shown in FIG. 2, the lens thickness of the biconvex lens L32 in the third lens component L3 is relatively great and the on-axis air gap between this biconvex lens L32 and the fourth lens component L4 is very short.

In any of the above-described embodiments, focusing is effected from infinity to a close distance by the totally axially moving system.

The numerical data of the respective embodiments of the present invention will be shown in Tables 1 to 5 below. In these tables, the numbers at the left end represent the order from the object side, r represents the radius of curvature of each lens surface, d represents the spacing between adjacent lens surfaces, and the refractive index n and Abbe number $\nu$ are values for d-line ($\lambda$=587.6 nm). FN represents F-number, and $2\omega$ indicates the angle of view.

TABLE 1

(First Embodiment)

f = 100.0
FN = 2.88
2ω = 63.6

| | r | d | v | n |
|---|---|---|---|---|
| 1 | 39.671 | 9.14 | 41.0 | 1.80500 |
| 2 | 57.105 | 4.00 | | |
| 3 | −130.700 | 2.86 | 27.8 | 1.69911 |
| 4 | 57.143 | 10.00 | 43.3 | 1.84042 |
| 5 | −133.667 | 12.00 | | |
| 6 | −39.290 | 2.86 | 35.5 | 1.59507 |
| 7 | 114.917 | 10.14 | 44.7 | 1.80218 |
| 8 | −42.384 | 8.57 | | |

TABLE 1-continued (First Embodiment)

f = 100.0
FN = 2.88
2ω = 63.6

| | r | d | v | n |
|---|---|---|---|---|
| 9 | −25.630 | 4.57 | 64.1 | 1.51680 |
| 10 | −39.674 | 57.48 | | |

The condition-corresponding values of the first embodiment are as follows:

(1) $\psi_{2M} \cdot r_{22}$ = −0.331
(2) $r_{31}/f_3$ = −0.295
(3) $\psi_{1-4}/\psi$ = 0.628
(4) $\psi_{3M}/\psi$ = 0.180
(5) $t_3/t_2$ = 0.714
(6) Np = 1.816
(7) Nn = 1.604

TABLE 2

(Second Embodiment)

f = 100.0
FN = 2.88
2ω = 63.4

| | r | d | v | n |
|---|---|---|---|---|
| 1 | 40.936 | 9.14 | 44.7 | 1.80218 |
| 2 | 57.301 | 4.00 | | |
| 3 | −149.580 | 2.86 | 32.2 | 1.67270 |
| 4 | 34.286 | 10.00 | 44.7 | 1.80218 |
| 5 | −171.428 | 12.00 | | |
| 6 | −39.393 | 2.86 | 35.5 | 1.59507 |
| 7 | 112.625 | 10.14 | 44.7 | 1.80218 |
| 8 | −42.850 | 8.57 | | |
| 9 | −24.728 | 4.57 | 64.1 | 1.51680 |
| 10 | −36.548 | 57.99 | | |

The condition-corresponding values of the second embodiment are as follows:

(1) $\psi_{2M} \cdot r_{22}$ = −0.647
(2) $r_{31}/f_3$ = −0.292
(3) $\psi_{1-4}/\psi$ = 0.608
(4) $\psi_{3M}/\psi$ = 0.184
(5) $t_3/t_2$ = 0.714
(6) Np = 1.802
(7) Nn = 1.595

TABLE 3

(Third Embodiment)

f = 100.0
FN = 2.88
2ω = 63.6

| | r | d | v | n |
|---|---|---|---|---|
| 1 | 36.795 | 8.57 | 46.4 | 1.80411 |
| 2 | 49.451 | 4.29 | | |
| 3 | −134.095 | 2.86 | 32.2 | 1.67270 |
| 4 | 40.561 | 7.43 | 46.4 | 1.80411 |
| 5 | −142.607 | 11.43 | | |
| 6 | −40.525 | 2.93 | 37.0 | 1.61293 |
| 7 | 97.639 | 9.76 | 44.7 | 1.80218 |
| 8 | −44.255 | 8.65 | | |
| 9 | −23.831 | 4.40 | 60.0 | 1.64000 |
| 10 | −31.870 | 59.74 | | |

The condition-corresponding values of the third embodiment are as follows:

(1) $\psi_{2M} \cdot r_{22}$ = −0.462
(2) $r_{31}/f_3$ = −0.275
(3) $\psi_{1-4}/\psi$ = 0.584
(4) $\psi_{3M}/\psi$ = 0.296
(5) $t_3/t_2$ = 0.757
(6) Np = 1.803
(7) Nn = 1.642

TABLE 4

(Fourth Embodiment)

f = 100.0
FN = 2.88
2ω = 63.4

| | r | d | v | n |
|---|---|---|---|---|
| 1 | 39.987 | 9.71 | 52.3 | 1.74810 |
| 2 | 56.507 | 4.00 | | |
| 3 | −125.799 | 2.86 | 32.2 | 1.67270 |
| 4 | 43.591 | 9.43 | 43.3 | 1.84042 |
| 5 | −140.097 | 10.86 | | |
| 6 | −38.347 | 2.86 | 35.5 | 1.59507 |
| 7 | 166.228 | 10.14 | 44.7 | 1.80218 |
| 8 | −42.415 | 9.71 | | |
| 9 | −24.851 | 4.57 | 53.6 | 1.54739 |
| 10 | −35.397 | 58.40 | | |

The condition-corresponding values of the fourth embodiment are as follows:

(1) $\psi_{2M} \cdot r_{22}$ = −0.539
(2) $r_{31}/f_3$ = −0.258
(3) $\psi_{1-4}/\psi$ = 0.594
(4) $\psi_{3M}/\psi$ = 0.125
(5) $t_3/t_2$ = 0.895
(6) Np = 1.797
(7) Nn = 1.605

TABLE 5

(Fifth Embodiment)

f = 100.0
FN = 2.88
2ω = 62.9

| | r | d | v | n |
|---|---|---|---|---|
| 1 | 37.198 | 8.58 | 55.6 | 1.69680 |
| 2 | 57.533 | 4.01 | | |
| 3 | −151.349 | 2.86 | 35.5 | 1.59507 |
| 4 | 39.481 | 9.87 | 49.5 | 1.74443 |
| 5 | −172.004 | 11.44 | | |
| 6 | −44.035 | 2.86 | 33.8 | 1.64831 |
| 7 | 89.874 | 12.59 | 43.3 | 1.84042 |
| 8 | −37.774 | 3.72 | | |
| 9 | −26.149 | 4.72 | 56.0 | 1.56883 |
| 10 | −58.521 | 69.40 | | |

The condition-corresponding values of the fifth embodiment are as follows:

(1) $\psi_{2M} \cdot r_{22}$ = −0.651
(2) $r_{31}/f_3$ = −0.537
(3) $\psi_{1-4}/\psi$ = 0.891
(4) $\psi_{3M}/\psi$ = 0.214
(5) $t_3/t_2$ = 0.325
(6) Np = 1.761
(7) Nn = 1.604

In any of the above-described embodiments of the present invention, various aberrations are corrected well and the fluctuations of the various aberrations are suppressed particularly from during infinity focusing to during short distance focusing, and there is maintained a good optical performance even during short distance focusing.

By introducing an aspherical surface into the first lens component L1 or the fourth lens component L4 of the present invention, it is possible to correct astigmatism and curvature of image field better and achieve a wide angle. Also, it is a matter of course from the way of using popular aspherical lenses that by introducing an aspherical surface into the second lens component L2 or the third lens component L3, it is possible to correct spherical aberration better and achieve a great aperture.

According to the present invention, a wide angle lens which is as bright as the order of F2.8 and has little distortion can be realized by a relatively simple lens construction. The present invention can be used as a lens not only for 35 mm format cameras, but also for large format cameras.

What is claimed is:

1. A wide angle objective lens including in succession from the object side:
   a first lens component comprising a positive meniscus lens having its convex surface facing the object side;
   a second lens component comprising a cemented meniscus lens comprising a negative lens and a positive lens cemented together and having its concave surface facing the object side and having positive refractive power;
   a third lens component comprising a cemented meniscus lens comprising a negative lens and a positive lens cemented together and having its concave surface facing the object side and having positive refractive power; and
   a fourth lens component comprising a negative meniscus lens having its concave surface facing the object side; and
   further having a stop between said second lens component and said third lens component;
   said wide angle objective lens being designed to satisfy the following conditions when the refractive power $\psi_{2M}$ of the cemented surface in said second lens component is expressed as $\psi_{2M} = (n_{22} - n_{21})/r_{2M}$ and the mean value of the absolute values of the refractive powers of said first to fourth lens components is $\psi_{1-4}$ and the refractive power of the entire optical system is $\psi$:

$$-0.9 \leq \psi_{2M} \cdot r_{22} \leq -0.1; \; r_{22} < 0$$

$$-0.6 \leq r_{31} \cdot f_3 \leq -0.1; \; r_{31} < 0$$

$$\psi_{1-4}/\psi < 0.9,$$

$n_{21}$: the refractive index of the negative lens in the second lens component for d-line ($\lambda = 587.6$ nm);
$n_{22}$: the refractive index of the positive lens in the second lens component for d-line ($\lambda = 587.6$ nm);
$r_{2M}$: the radius of curvature of the cemented surface in the second lens compartment;
$r_{22}$: the radius of curvature of that surface of the second lens component which is most adjacent to the image side;
$r_{31}$: the radius of curvature of that surface of the third lens component which is most adjacent to the object side;
$f_3$: the focal length of the third lens component.

2. A wide angle objective lens according to claim 1, wherein when the refractive power $\psi_{3M}$ of the cemented surface in said third lens component is expressed as $\psi_{3M} = (n_{32} - n_{31})/r_{3M}$, said third lens component is designed to satisfy the following condition:

$$0 < \psi_{3M}/\psi < 0.5; \; r_{3M} > 0,$$

where
$n_{31}$: the refractive index of the negative lens in the third lens component for d-line ($\lambda = 587.6$ nm);
$n_{32}$: the refractive index of the positive lens in the third lens component for d-line ($\lambda = 587.6$ nm);
$r_{3M}$: the radius of curvature of the cemented surface in the third lens component;
$\psi$: the refractive power of the entire optical system.

3. A wide angle objective lens according to claim 1, wherein when the air gap on the optical axis from that surface of said second lens component which is most adjacent to the image side to that surface of said third lens component which is most adjacent to the object side is $t_2$ and the air gap on the optical axis from that surface of said third lens component which is most adjacent to the image side to that surface of said fourth lens component which is most adjacent to the object side is $t_3$, said second to fourth lens components are disposed so as to satisfy the following condition:

$$0.2 \leq t_3/t_2 \leq 1.0$$

4. A wide angle objective lens according to claim 1, wherein when the mean value of the refractive indices of the positive meniscus lens in said first lens component, the positive lens in said second lens component and the positive lens in said third lens component for d-line ($\lambda = 587.6$ nm) is Np and the mean value of the refractive indices of the negative lens in said second lens component, the negative lens in said third lens component and said third lens component for d-line ($\lambda = 587.6$ nm) is Nn, said wide angle objective lens is designed to further satisfy the following conditions:

$$Np > 1.70, \; Nn < 1.70$$

5. A wide angle objective lens according to claim 1, deisgned in accordance with the following data:

| f | = 100.0 | | | |
| FN | = 2.88 | | | |
| 2ω | = 63.6 | | | |
| | r | d | ν | n |
| --- | --- | --- | --- | --- |
| 1 | 39.671 | 9.14 | 41.0 | 1.80500 |
| 2 | 57.105 | 4.00 | | |
| 3 | −130.700 | 2.86 | 27.8 | 1.69911 |
| 4 | 57.143 | 10.00 | 43.3 | 1.84042 |
| 5 | −133.667 | 12.00 | | |
| 6 | −39.290 | 2.86 | 35.5 | 1.59507 |
| 7 | 114.917 | 10.14 | 44.7 | 1.80218 |
| 8 | −42.384 | 8.57 | | |
| 9 | −25.630 | 4.57 | 64.1 | 1.51680 |
| 10 | −39.674 | 57.48 | | |

| (1) | $\psi_{2M} \cdot r_{22}$ | = −0.331 |
| --- | --- | --- |
| (2) | $r_{31}/f_3$ | = −0.295 |
| (3) | $\psi_{1-4}/\psi$ | = 0.628 |
| (4) | $\psi_{3M}/\psi$ | = 0.180 |
| (5) | $t_3/t_2$ | = 0.714 |
| (6) | Np | = 1.816 |
| (7) | Nn | = 1.604 | where the numbers at the left end represent the order from the object side, r represents the radius of curvature of each lens surface, d represents the spacing between adjacent lens surfaces, the refractive index n and Abbe number $\nu$ indicate values for d-line ($\lambda=587.6$ nm), FN indicates F-number, and $2\omega$ indicates the angle of view;

$t_2$: the air gap on the optical axis from that surface of the second lens component which is most adjacent to the image side to that surface of the third lens component which is most adjacent to the object side;

$t_3$: the air gap on the optical axis from that surface of the third lens component which is most adjacent to the image side to that surface of the fourth lens component which is most adjacent to the object side;

Np: the mean value of the refractive indices of the positive meniscus lens of the first lens component, the positive lens in the second lens component and the positive lens in the third lens component for d-line ($\lambda=587.6$ nm);

Nn: the mean value of the refractive indices of the negative lens in the second lens component, the negative lens in the third lens component and the third lens component for d-line ($\lambda=587.6$ nm);

$\psi_{3M}$: the refractive power of the cemented surface in the third lens component expressed by the following equation: $\psi_{3M}=(n_{32}-n_{31})/r_{3M}$ ($n_{31}$: the refractive index of the negative lens in the third lens component for d-line ($\lambda=587.6$ nm), $n_{32}$: the refractive index of the positive lens in the third lens component for d-line ($\lambda=587.6$ nm), $r_{3M}$: the radius of curvature of the cemented surface in the third lens component).

6. A wide angle objective lens according to claim 1, designed in accordance with the following data:

| f | = 100.0 | | | |
|---|---|---|---|---|
| FN | = 2.88 | | | |
| $2\omega$ | = 63.4 | | | |
| | r | d | $\nu$ | n |
| 1 | 40.936 | 9.14 | 44.7 | 1.80218 |
| 2 | 57.301 | 4.00 | | |
| 3 | −149.580 | 2.86 | 32.2 | 1.67270 |
| 4 | 34.286 | 10.00 | 44.7 | 1.80218 |
| 5 | −171.428 | 12.00 | | |
| 6 | −39.393 | 2.86 | 35.5 | 1.59507 |
| 7 | 112.625 | 10.14 | 44.7 | 1.80218 |
| 8 | −42.850 | 8.57 | | |
| 9 | −24.728 | 4.57 | 64.1 | 1.51680 |
| 10 | −36.548 | 57.99 | | |
| (1) $\psi_{2M} \cdot r_{22}$ | = −0.647 | | | |
| (2) $r_{31}/f_3$ | = −0.292 | | | |
| (3) $\psi_{1-4}/\psi$ | = 0.608 | | | |
| (4) $\psi_{3M}/\psi$ | = 0.184 | | | |
| (5) $t_3/t_2$ | = 0.714 | | | |
| (6) Np | = 1.802 | | | |
| (7) Nn | = 1.595 | | | | where the numbers at the left end represents the order from the object side, r represents the radius of curvature of each lens surface, d represents the spacing between adjacent lens surfaces, the refractive index n and Abbe number $\nu$ indicate values for d-line ($\lambda=587.6$ nm), FN indicates F-number, and $2\omega$ indicates the angle of view;

$t_2$: the air gap on the optical axis from that surface of the second lens component which is most adjacent to the image side to that surface of the third lens component which is most adjacent to the object side;

$t_3$: the air gap on the optical axis from that surface of the third lens component which is most adjacent to the image side to that surface of the fourth lens component which is most adjacent to the object side;

Np: the mean value of the refractive indices of the positive meniscus lens of the first lens component, the positive lens in the second lens component and the positive lens in the third lens component for d-line ($\lambda=587.6$ nm);

Nn: the mean value of the refractive indices of the negative lens in the second lens component, the negative lens in the third lens component and the third lens component for d-line ($\lambda=587.6$ nm);

$\psi_{3M}$: the refractive power of the cemented surface in the third lens component expressed by the following equation: $\psi_{3M}=(n_{32}-n_{31})/r_{3M}$ ($n_{31}$: the refractive index of the negative lens in the third lens component for d-line ($\lambda=587.6$ nm), $n_{32}$: the refractive index of the positive lens in the third lens component for d-line ($\lambda=$j587.6 nm), $r_{3M}$: the radius of curvature of the cemented surface in the third lens component).

7. A wide angle objective lens according to claim 1, designed in accordance with the following data:

| f | = 100.0 | | | |
|---|---|---|---|---|
| FN | = 2.88 | | | |
| $2\omega$ | = 63.6 | | | |
| | r | d | $\nu$ | n |
| 1 | 36.795 | 8.57 | 46.4 | 1.80411 |
| 2 | 49.451 | 4.29 | | |
| 3 | −134.095 | 2.86 | 32.2 | 1.67270 |
| 4 | 40.561 | 7.43 | 46.4 | 1.80411 |
| 5 | −142.607 | 11.43 | | |
| 6 | −40.525 | 2.93 | 37.0 | 1.61293 |
| 7 | 97.639 | 9.76 | 44.7 | 1.80218 |
| 8 | −44.255 | 8.65 | | |
| 9 | −23.831 | 4.40 | 60.0 | 1.64000 |
| 10 | −31.870 | 59.74 | | |
| (1) $\psi_{2M} \cdot r_{22}$ | = −0.462 | | | |
| (2) $r_{31}/f_3$ | = −0.275 | | | |
| (3) $\psi_{1-4}/\psi$ | = 0.584 | | | |
| (4) $\psi_{3M}/\psi$ | = 0.296 | | | |
| (5) $t_3/t_2$ | = 0.757 | | | |
| (6) Np | = 1.803 | | | |
| (7) Nn | = 1.642 | | | | where the numbers at the left end represents the order from the object side, r represents the radius of curvature of each lens surface, d represents the spacing between adjacent lens surfaces, the refractive index n and Abbe number $\nu$ indicate values for d-line ($\lambda=587.6$ nm), FN indicates F-number, and $2\omega$ indicates the angle of view;

$t_2$: the air gap on the optical axis from that surface of the second lens component which is most adjacent to the image side to that surface of the third lens component which is most adjacent to the object side;

$t_3$ the air gap on the optical axis from that surface of the third lens component which is most adjacent to the image side to that surface of the fourth lens component which is most adjacent to the object side;

Np: the mean value of the refractive indices of the positive meniscus lens of the first lens component, the positive lens in the second lens component and the positive lens in the third lens component for d-line ($\lambda=587.6$ nm);

Nn: the mean value of the refractive indices of the negative lens in the second lens component, the negative lens in the third lens component and the third lens component for d-line ($\lambda=587.6$ nm);

$\psi_{3M}$: the refractive power of the cemented surface in the third lens component expressed by the following equation: $\psi_{3M}=(n_{32}-n_{31})/r_{3M}$ ($n_{31}$: the refractive index of the negative lens in the third lens component for d-line ($\lambda=587.6$ nm), $n_{32}$: the refractive index of the positive lens in the third lens component for d-line ($\lambda=587.6$ nm), $r_{3M}$: the radius of curvature of the cemented surface in the third lens component).

8. A wide angle objective lens according to claim 1, designed in accordance with the following data:

| f | = 100.0 | | | |
| FN | = 2.88 | | | |
| 2ω | = 63.4 | | | |
| | r | d | v | n |
| 1 | 39.987 | 9.71 | 52.3 | 1.74810 |
| 2 | 56.507 | 4.00 | | |
| 3 | −125.799 | 2.86 | 32.2 | 1.67270 |
| 4 | 43.591 | 9.43 | 43.3 | 1.84042 |
| 5 | −140.097 | 10.86 | | |
| 6 | −38.347 | 2.86 | 35.5 | 1.59507 |
| 7 | 166.228 | 10.14 | 44.7 | 1.80218 |
| 8 | −42.415 | 9.71 | | |
| 9 | −24.851 | 4.57 | 53.6 | 1.54739 |
| 10 | −35.397 | 58.40 | | |
| (1) $\psi_{2M}\cdot r_{22}$ | = −0.539 | | | |
| (2) $r_{31}/f_3$ | = −0.258 | | | |
| (3) $\psi_{1-4}/\psi$ | = 0.594 | | | |
| (4) $\psi_{3M}/\psi$ | = 0.125 | | | |
| (5) $t_3/t_2$ | = 0.895 | | | |
| (6) Np | = 1.797 | | | |
| (7) Nn | = 1.605 | | | | where the numbers at the left end represent the order from the object side, r represents the radius of curvature of each lens surface, d represents the spacing between adjacent lens surfaces, the refractive index n and Abbe number υ indicate values for d-line ($\lambda=587.6$ nm), FN indicates F-number, and 2ω indicates the angle of view;

$t_2$: the air gap on the optical axis from that surface of the second lens component which is most adjacent to the image side to that surface of the third lens component which is most adjacent to the object side;

$t_3$: the air gap on the optical axis from that surface of the third lens component which is most adjacent to the image side to that surface of the fourth lens component which is most adjacent to the object side;

Np: the mean value of the refractive indices of the positive meniscus lens of the first lens component, the positive lens in the second lens component and the positive lens in the third lens component for d-line ($\lambda=587.6$ nm);

Nn: the mean value of the refractive indices of the negative lens in the second lens component, the negative lens in the third lens component and the third lens component for d-line ($\lambda=587.6$ nm);

$\psi_{3M}$: the refractive power of the cemented surface in the third lens component expressed by the following equation: $\psi_{3M}=(n_{32}-n_{31})/r_{3M}$ ($n_{31}$: the refractive index of the negative lens in the third lens component for d-line ($\lambda=587.6$ nm), $n_{32}$: the refractive index of the positive lens in the third lens component for d-line ($\lambda=587.6$ nm), $r_{3M}$: the radius of curvature of the cemented surface in the third lens component).

9. A wide angle objective lens according to claim 1, designed in accordance with the following data:

| f | = 100.0 | | | |
| FN | = 2.88 | | | |
| 2ω | = 62.9 | | | |
| | r | d | v | n |
| 1 | 37.198 | 8.58 | 55.6 | 1.69680 |
| 2 | 57.33 | 4.01 | | |
| 3 | −151.349 | 2.86 | 35.5 | 1.59507 |
| 4 | 39.481 | 9.87 | 49.5 | 1.74443 |
| 5 | −172.004 | 11.44 | | |
| 6 | −44.035 | 2.86 | 33.8 | 1.64831 |
| 7 | 89.874 | 12.59 | 43.3 | 1.84042 |
| 8 | −37.774 | 3.72 | | |
| 9 | −26.149 | 4.72 | 56.0 | 1.56883 |
| 10 | −58.521 | 69.40 | | |
| (1) $\psi_{2M}\cdot r_{22}$ | = −0.651 | | | |
| (2) $r_{31}/f_3$ | = −0.537 | | | |
| (3) $\psi_{1-4}/\psi$ | = 0.891 | | | |
| (4) $\psi_{3M}/\psi$ | = 0.214 | | | |
| (5) $t_3/t_2$ | = 0.325 | | | |
| (6) Np | = 1.761 | | | |
| (7) Nn | = 1.604 | | | | where the numbers at the left end represent the order from the object side, r represents the radius of curvature of each lens surface, d represents the spacing between adjacent lens surfaces, the refractive index n and Abbe number υ indicate values for d-line ($\lambda=587.6$ nm), FN indicates F-number, and 2ω indicates the angle of view;

$t_2$: the air gap on the optical axis from that surface of the second lens component which is most adjacent to the image side to that surface of the third lens component which is most adjacent to the object side;

$t_3$: the air gap on the optical axis from that surface of the third lens component which is most adjacent to the image side to that surface of the fourth lens component which is most adjacent to the object side;

Np: the mean value of the refractive indices of the positive meniscus lens of the first lens component, the positive lens in the second lens component and the positive lens in the third lens component for d-line ($\lambda=587.6$ nm);

Nn: the mean value of the refractive indices of the negative lens in the second lens component, the negative lens in the third lens component and the third lens component for d-line ($\lambda=587.6$ nm);

$\psi_{3M}$: the refractive power of the cemented surface in the third lens component expressed by the following equation: $\psi_{3M}=(n_{32}-n_{31})/r_{3M}$ ($n_{31}$: the refractive index of the negative lens in the third lens component for d-line ($\lambda=587.6$ nm), $n_{32}$: the refractive index of the positive lens in the third lens component for d-line ($\lambda=587.6$ nm), $r_{3M}$: the radius of curvature of the cemented surface in the third lens component).

10. A wide angle objective lens including in succession from the object side:

a first lens component comprising a positive meniscus lens having its convex surface facing the object side;

a second lens component comprising a cemented meniscus lens comprising a negative biconcave lens and a positive biconvex lens cemented together and having its concave surface facing the object side and having positive refractive power;

a third lens component comprising a cemented meniscus lens comprising a negative biconcave lens and a positive biconvex lens cemented together and having its concave surface facing the object side and having positive refractive power; and a fourth lens component comprising a negative meniscus lens having its concave surface facing the object side; and further having a stop between said second lens component and said third lens component.

11. A wide angle objective lens according to claim 10, wherein when the refractive index of said biconcave lens in said second lens component for d-line ($\lambda=587.6$ nm) is $n_{21}$ and the refractive index of said biconvex lens for d-line ($\lambda=587.6$ nm) is $n_{22}$ and the radius of curvature of the cemented surface of said biconcave lens and said biconvex lens is $r_{2M}$ and the radius of curvature of that surface of said second lens component which is most adjacent to the image side is $r_{22}$ and the refractive power $\psi_{2M}$ of the cemented surface of said biconcave lens and said biconvex lens is expressed as $\psi_{2M}=(n_{22}-n_{21})/r_{2M}$, said second lens component is designed to satisfy the following condition:

$$-0.9 \leq \psi_{2M} \cdot r_{22} \leq -0.1; r_{22} < 0$$

12. A wide angle objective lens according to claim 10, wherein when the radius of curvature of that surface of said third lens component which is most adjacent to the object side is $r_{31}$ and the focal length of said third lens component is $f_3$ and the refractive index of said concave lens in said third lens component for d-line ($\lambda=587.6$ nm) is $n_{31}$ and the refractive index of said biconvex lens for d-line ($\lambda=587.6$ nm) is $n_{32}$ and the radius of curvature of the cemented surface of said biconcave lens and said biconvex lens is $r_{3M}$ and the refractive power of the entire optical system is $\psi$ and the refractive power $\psi_{3M}$ of the cemented surface of said bocincave lens and said biconvex lens is expressed as $\psi_{3M}=(n_{32}-n_{31})/r_{3M}$, said third lens component is designed to satisfy the following conditions:

$$-0.6 \leq r_{31} \cdot f_3 \leq -0.1; r_{31} < 0$$

$$0 < \psi_{3M}/\psi < 0.5; r_{3M} > 0$$

13. A wide angle objective lens according to claim 10, wherein when the mean value of the absolute values of the refractive powers of said first to fourth lens components is $\psi_{1-4}$ and the refractive power of the entire optical system is $\psi$, said lens components are designed to further satisfy the following condition:

$$\psi_{1-4}/\psi < 0.9$$

14. A wide angle objective lens according to claim 10, wherein when the air gap on the optical axis from that surface of said second lens component which is most adjacent to the image side to that surface of said third lens component which is most adjacent to the object side is $t_2$ and the air gap on the optical axis from that surface of said third lens component which is most adjacent to the image side to that surface of said fourth lens component which is most adjacent to the object side is $t_3$, said second to fourth lens components are designed to satisfy the following condition:

$$0.2 \leq t_3/t_2 \leq 1.0$$

15. A wide angle objective lens according to claim 10, wherein when the mean value of the refractive indices of the positive meniscus lens in said first lens component, the positive biconvex lens in said second lens component and the positive biconvex lens in said third lens component for d-line ($\lambda=587.6$ nm) is Np and the mean value of the refractive indices of the negative biconcave lens in said second lens component, the negative biconcave lens in said third lens component and the negative meniscus lens of said fourth lens component for d-line ($\lambda=587.6$ nm) is Nn, said wide angle objective lens is designed to further satisfy the following conditions:

$$Np > 1.70, Nn < 1.70.$$

* * * * *